Feb. 15, 1938.      C. N. BERGMANN      2,108,522
CONTAINER CONVEYER AND DISTRIBUTOR
Filed Nov. 19, 1936      2 Sheets-Sheet 1
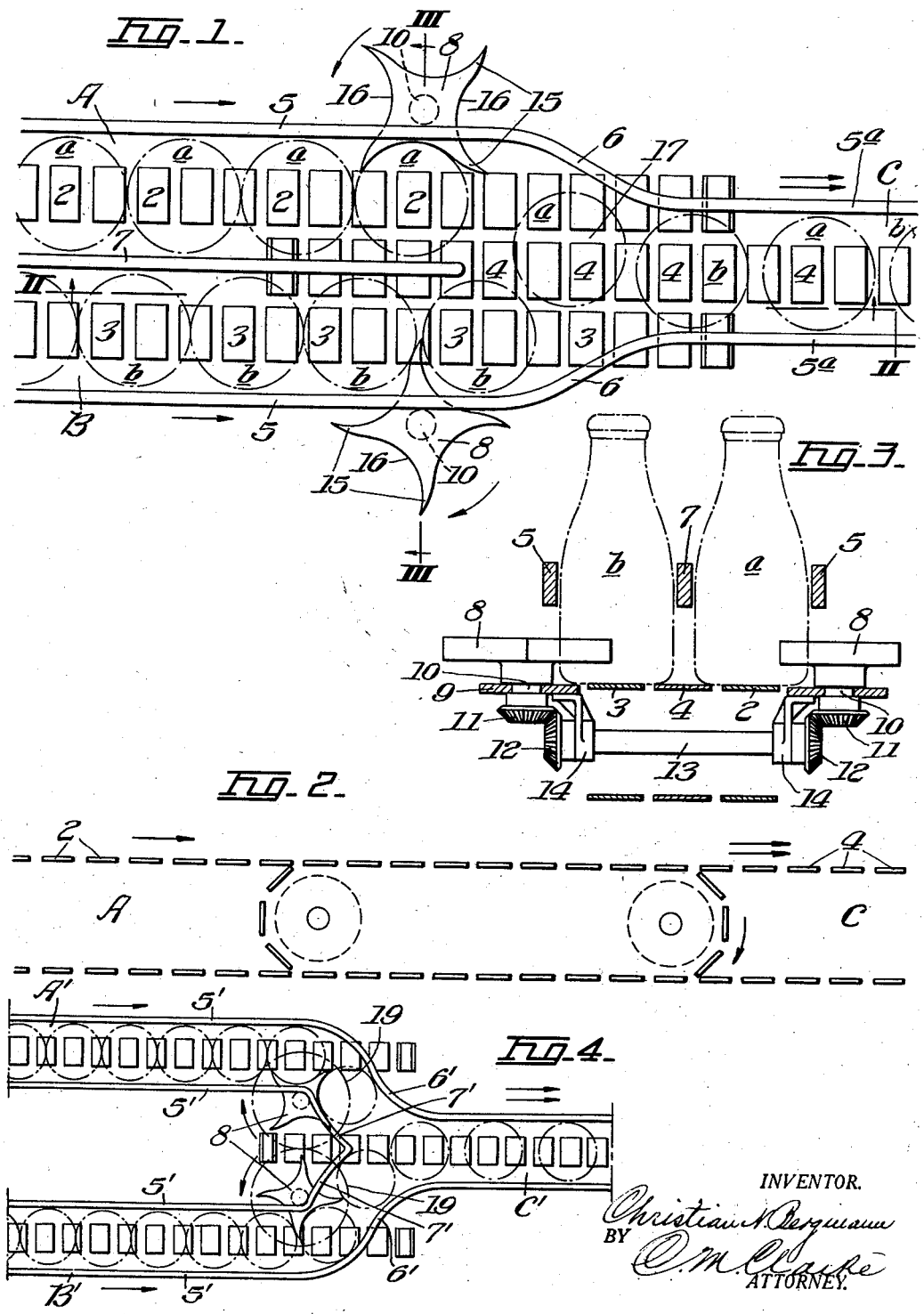

Feb. 15, 1938.  C. N. BERGMANN  2,108,522
CONTAINER CONVEYER AND DISTRIBUTOR
Filed Nov. 19, 1936  2 Sheets-Sheet 2
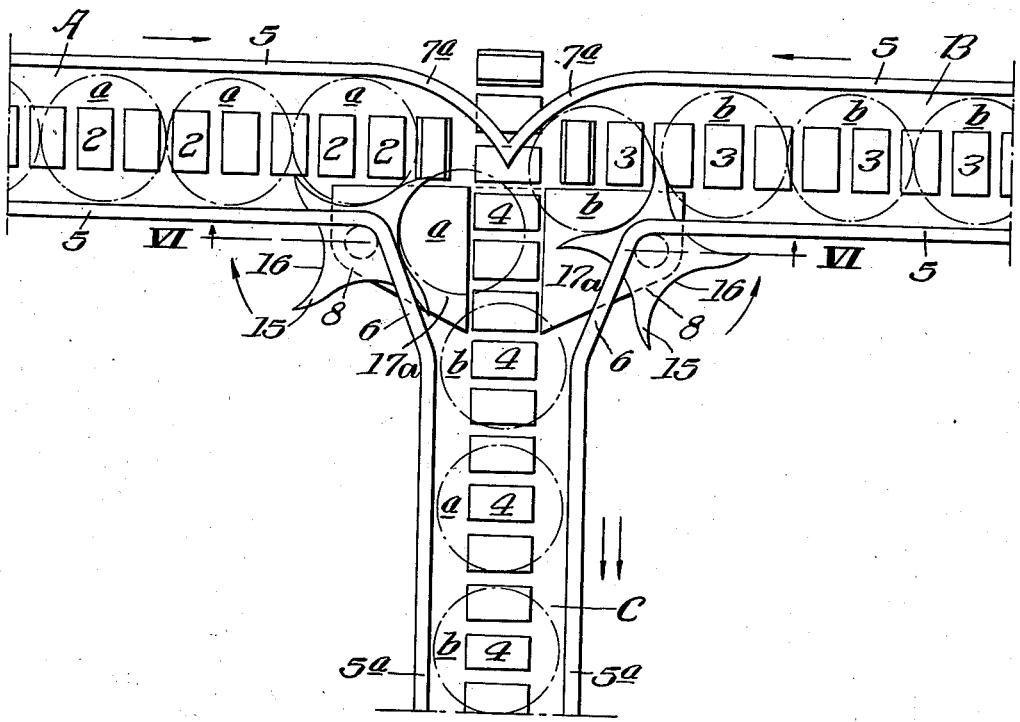
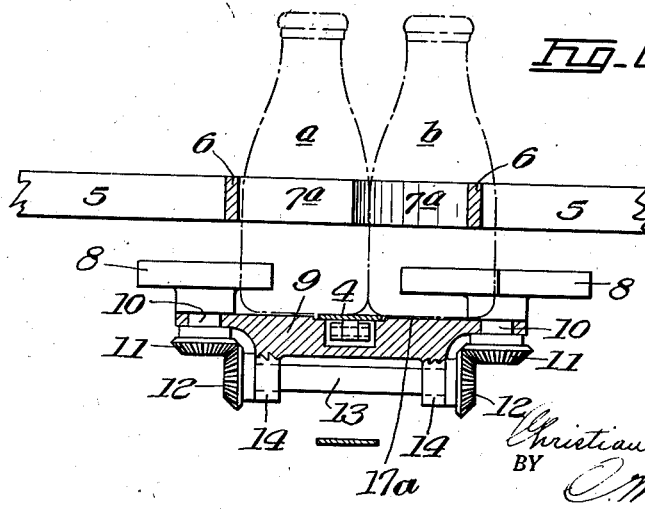
INVENTOR.
Christian N. Bergmann
BY
ATTORNEY.

Patented Feb. 15, 1938

2,108,522

UNITED STATES PATENT OFFICE 2,108,522

CONTAINER CONVEYER AND DISTRIBUTOR

Christian N. Bergmann, Pittsburgh, Pa., assignor of two-sixths to Charles M. Clarke, Sewickley, Pa.

Application November 19, 1936, Serial No. 111,666

10 Claims. (Cl. 198—32)

My invention is an improvement in distributing conveyers for containers such as bottles, cans, or the like. It is particularly adapted to the art of conveying cylindrical units, as milk bottles, from two sources or stations, to a single station or delivery destination, by merging two rows into one.

Generally stated, it comprises two laterally disposed or side by side feeding conveyers or trackways leading directly to the receiving terminal or any portion of a faster moving delivery conveyer, and controlling means actuated by the conveyed units for selecting the approaching terminal unit of each of two approaching rows or columns and delivering such unit individually and alternately to the single delivery or carry off conveyer.

The active elements of the selecting means consist of a pair of star shaped or toothed rotating switching or movement controlling devices or wheels, of special construction, pivotally mounted laterally of each of the feeding conveyers or trackways, adjacent their junction with the single delivery conveyer. These star wheels, while freely mounted by their pivoting shafts and actuated only by the oncoming streams of units, are however so connected by compensating gearing, as to synchronize with each other in regulating and ensuring alternate engagement with and disposal of the successive units of the pair of conveyers, for alternate discharge to and upon the delivery conveyer.

Certain preferred constructions and embodiments of the invention are illustrated in the accompanying drawings, in which:

Fig. 1 is a plan view showing a pair of side by side conveyer trackways and means directing movement of articles therefrom to a receiving conveyer;

Fig. 2 is a longitudinal section on the line II—II of Fig. 1;

Fig. 3 is a cross section on the line III—III of Fig. 1;

Fig. 4 is a view like Fig. 1 showing a modified arrangement of conveyer trackways;

Fig. 5 is a plan view showing a further modification in which the receiving conveyer is between oppositely approaching feeding conveyers;

Fig. 6 is a cross section on the line VI—VI of Fig. 5.

In respect of the special advantages and results secured by the present invention it utilizes the principle, and to a degree, means similar to those disclosed in my prior Patent No. 2,085,410.

I show in Fig. 1 a plan view of one arrangement wherein the side by side terminals of two conveying conveyers A and B lead towards and into the receiving end of a common delivery trackway C, embodying a conveyer running in the same general direction, and at a faster speed, and preferably on a midway alinement with conveyers A and B.

It may be assumed that conveyers A and B lead from two individual washers and that conveyer C delivers to a single filling machine; or from two indiivdual filling machines to a capping or packing station, or the like. In either case the conveying means of each is conventional and of well known construction, utilizing supporting and conveying belts or chains having base supporting slats or links 2, 3 and 4 respectively.

These are mounted in usual endless chain sections upon head and tail sprockets or the like, with driving and idler shafting, as will be readily understood, and geared for suitable speeds.

The speed of the delivering or carrying off conveyer C should be at least double, or slightly more than double that of conveyers A and B, enabling it to carry the loads of both with easy and regular distribution.

Conveyers A and B are defined by the conveyer strands 2 and 3 and conveyer C by strands 4 in connection with flanking guides 5 and 5a with intervening inwardly sloping or deflected fending sections 6. Sections 6 converge from their outer double width capacity, as of conveyers A and B, towards and into the single width capacity of conveyer C, and are conformably designed to shift the units inwardly and forwardly in their conveyor-actuated progress from both to the one single line conveyer.

Cooperating with outer guides 5 and extending between them to the double-single junction, and with proper clearance beyond its terminal, is an intermediate similar guide 7, the several guides being located somewhat above the conveyer pathways. As shown the delivery terminals of conveyers A and B extend appreciably beyond the side by side receiving terminal of intervening conveyer C, of faster speed. As each forward unit approaches the junction on strands 2 and 3 its inner bottom edge is apt to receive a partial acceleration and rotation by contact with strands 4. When the unit from either side is fended inwardly by either guide section 6, still under the impulse of strands 2 or 3, it is located finally in middle position upon strands 4 of the faster moving conveyer C, and is carried away thereby.

Ordinarily two such converging columns of units will not accurately and continuously merge into a single column without some controlling factor regulating their progress, time and order of merger, without jamming or interference.

In my invention I have utilized a pair of star wheels 8, generally similar to those of my former application noted above. Each consists of a middle body or hub portion rotatably mounted at opposite sides of a main base or floor structure 9 by stud or shaft 10, for free rotation in opposite directions, except as controlled by the opposite companion wheel. Each such star wheel is provided with a surrounding series of equally spaced projecting pointed fingers 15 deflected in the direction of rotation, and alternating concaved edge faces 16. The curvature of said concave faces preferably closely approximates the curvature of the units being moved, and the fingers 15 extend sufficiently for initial rotating engagement by an approaching unit, and for separation of an adjacent unit.

An especial advantage in the slightly deflected tapering and pointed terminals 15 of the star wheels is that they are enabled to enter between two closely contacting units of an approaching series, in the manner of a wedge. Thus an advancing unit having been pushed sufficiently far to engage the concave face of the star wheel, also bears against the prong or finger beyond it, and tends to rotate the star wheel. The next prong is thus brought around and its wedge-like point is inserted between the front unit and the next one behind and moving against it, by action of the conveyer chain.

The two star wheels at directly opposite positions are so located and maintained as to always maintain their relative positions as shown in Fig. 1, i. e. with the fingers 15 of one a half space in advance of the others, or normally registering with the middle of an opposite concavity 16.

By such provision alternating and regulated release of the front units of the two oncoming series is ensured, so that alternate units pass onwardly to conveyer C without interference.

For the purpose of thus maintaining the pair of star wheels they are geared together by any suitable means ensuring their relative position constantly during operation. One such means is by a pair of gears 11 secured to studs 10 engaging gears 12 of a cross shaft 13 mounted in bearings 14. However any other suitable means may be utilized whereby, without other driving power, the conveyer-propelled units themselves will actuate the star wheels together, or whereby if one only is actuated, as by a single column of units in either conveyer A or B, the other will be rotated idly in desired conformity.

The base portion 9 of the equipment may be of any suitable design approved by good practice either with or without flooring plates throughout, the conveyer preferably being closely adjacent with clearance 17 between conveyers A, B, and conveyer C. At such locations the smooth surfaces of the conveyers are on a common plane and sufficiently adjacent to facilitate the passage thereover of the several units.

Assuming two advancing columns of units a and b, the front one of either will first contact the terminal 15 of the first star wheel to be engaged and will rotate it, bringing its next adjacent concavity 16 into embracing engagement with the unit. The opposite star wheel will be simultaneously rotated, bringing the tip end of a corresponding terminal into engageable relation with an opposite unit. The first unit will be pushed along by the conveyer and the unit behind it, with continued rotation of the star wheels, and will be then delivered across to the throat of conveyer C in advance of the opposite temporarily delayed unit. When such opposite unit as b is then released by continued rotation of its star wheel it will be delivered in the same manner and carried away behind the first or opposite unit, by the higher speed of conveyer C. The operation will thus continue, with alternate engagement and spaced delivery, so long as series of units a and b are supplied, or of a or b only of one side supply, but in such case with use of only one half capacity of conveyer C.

I show in Fig. 4 a modified arrangement in which the trackways A' and B' are spaced somewhat further apart, sufficient to locate the star wheels 8 between them. In such case the star wheels act on the inner faces of the units, under control of the straight and deflecting guides 5', 6' and 7'. The operation in such case is substantially the same as above described, the spindles of the star wheels being closer together and connected for opposite rotation by any suitable means, such as a pair of intermeshing gears 19. The impelled units, regulated by the star wheels, and impelled by the low speed conveyers A' and B', are pushed along and around their guiding conveyer, onto the faster carry-off trackway C'.

In either case the two streams of incoming units moving towards the receiving throat of the delivery conveyer C or C', are entirely independent of each other. Each unit of each column is controlled and regulated by its particular star wheel, individually, whether the opposite companion star wheel is active or merely rotating idly.

Each column of units on conveyers A and B is separate and independent of the other and each is provided with and is under the straight line and laterally deflecting control of the flanking guides 5 and 7 and laterally directing section 6.

Furthermore, by reason of the construction, relative arrangement, and relative speeds of the feeding conveyers and the receiving conveyer, and of the individual controlling action of each star wheel, the positive and selective action of each is ensured. This result is due to the fact that each star wheel is individually actuated by the oncoming unit of its particular stream, first engaging its tapering point 15, which is purposely deflected in the direction of rotation, and then engaging its immediately following concavity 16. As stated, such is the operation with each wheel whether its opposite companion wheel is active or not. When both are active in normal operation on two opposite rows of units, the star wheels being synchronized, operate together, and deliver alternately to the faster moving conveyer C, without interference and with proper spacing.

I show in Fig. 5 a modified construction in which the feeding conveyers A and B approach the faster moving delivery conveyer C from opposite sides and at substantially right angles thereto. The guides 5—5 of the feeding conveyers extend along at each side of chain strands 2 and 3 in parallelism towards the junction, and are both then disposed in the direction of movement of the delivery conveyer C, for rounding travel of the units thereto. Thus the inner guides 5 merge into the pair of straight guides 5a by intervening inclined sections 6, providing a widened entrance throat, and the outer guides 5 are rounded inwardly conformably as at 7a, and terminate midway of the delivery conveyer C.

By such arrangement the units a and b are moved inwardly by conveyers A and B from opposite sides, are propelled and fended across, and regularly and alternately discharged onto the faster delivery conveyer C, as controlled by the pair of star wheels 8. These are pivotally located as shown, at opposite positions, for engagement by each approaching unit upon arriving at the inwardly receiving throat of the delivery conveyer and subject to the laterally deflecting control of outer guide terminals 7a, towards the strands 4.

Curved guide portions 7a also definitely guide the units towards the star wheels and effectively maintain engagement with their concave faces by the units in moving over to conveyer C.

Flooring bridge sections 17a are preferably provided, flush with the conveyer surfaces, for smooth sliding movement thereover of the units in passing around from the terminals of conveyers A and B onto the receiving strands of delivery conveyer C, as controlled by the alternately delivering star wheels 8.

These are maintained in continuously synchronizing relation by suitable means, as by connecting their studs 10 with cooperating gearing 11—12 and a cross shaft 13 supported by bearings 14 depending from the bridge or floor plate 9, for opposite controlled rotation, as in Fig. 6.

The operation, except as to absorbing the loads of two oppositely approaching trackways by an intervening faster speed delivery conveyer, running at an angle thereto, is substantially the same as before described. The shifting of each unit around the corner junction onto the common delivery conveyer is easily and regularly effected by the relatively slow and fast speeds; the open throat of the receiving conveyer; the outer inwardly curving terminal guides 7a of both trackways A and B; and the positive individual controlling and regulating action of the star wheels 8.

I claim:

1. In combination, a delivery conveyer, a pair of relatively slower feeding conveyers leading thereto, a pair of rotatable unit-movement-controlling star wheels located adjacent to the junction of said conveyers and in operative relation to the feeding conveyers, and means connecting the star wheels for simultaneous rotation.

2. In combination, a delivery conveyer, a pair of relatively slower feeding conveyers leading thereto, guides for said conveyers directing units from the feeding conveyers to the delivery conveyer, a pair of rotatable unit-movement-controlling star wheels each in operative relation to one of the feeding conveyers, and means connecting the star wheels for simultaneous rotation.

3. In combination, a pair of feeding conveyers, a delivery conveyer of faster speed, unit directing guides flanking said conveyers having junction connection between the feeding conveyers and the delivery conveyer providing a converging throat for the delivery conveyer, a pair of rotatable unit-movement-controlling star wheels in operative relation to the feeding conveyers, and means connecting the star wheels for simultaneous rotation.

4. In combination, a delivery conveyer of sufficient speed and capacity to receive and transfer the discharge thereto of contributing conveyers, a pair of contributing conveyers leading thereto at opposite sides, unit supporting bridge members between the contributing conveyers and the delivery conveyer, a pair of pivotally mounted star wheels in operative relation to the contributing conveyers, and synchronizing gearing connecting the star wheels for simultaneous operation upon either being engaged by a conveyed unit of a contributing conveyer.

5. In combination, a delivery conveyer of sufficient speed and capacity to receive and transfer the discharge thereto of contributing conveyers, a pair of contributing conveyers leading thereto at opposite sides, unit supporting bridge members between the contributing conveyers and the delivery conveyer, flanking guide members for said conveyers disposed at their junction for lateral shifting of conveyed units from the contributing conveyers to the delivery conveyer, a pair of pivotally mounted star wheels in operative relation to the contributing conveyers, and synchronizing gearing connecting the star wheels for simultaneous operation upon either being engaged by a conveyed unit of a contributing trackway.

6. In combination, a single line delivery conveyer of sufficient speed and capacity to receive and transfer the double line discharge thereto of contributing conveyers, a pair of contributing conveyers leading thereto from opposite sides, a pair of pivotally mounted star wheels in operative relation to the contributing conveyers, and synchronizing gearing connecting the star wheels for simultaneous operation upon either being engaged by a conveyed unit of a contributing trackway.

7. In combination with two independent conveyers adapted to deliver cylindrical units alternately to an intervening carry-off conveyer, guides therefor, a pair of pivotally mounted star wheels each provided with an alternating series of equally spaced concave faces approximating unit contour curvature and laterally projecting fingers having tapered pointed terminals traversable across said two conveyer paths for engagement by an advancing unit at either side and rotative insertion between it and a preceding unit, and synchronizing means connecting the star wheels operative by unit engagement of either star wheel upon conveyer movement.

8. A container conveyer and distributor for bottles or the like comprising a pair of side conveyers adapted to receive the bottles and upon which they travel in single rows, a single intervening delivery conveyer operating at a faster speed than said pair, guides for said conveyers including deflecting sections at the junction between the pair and said single conveyer, a pair of star wheels each located in the path of bottles being moved along the pair of conveyers, the arms of said star wheels being arranged in staggered relation for individual alternating engagement by and between the adjacent units of each row thereof, and synchronizing means connecting said star wheels causing them to operate in unison and distribute the bottles alternately and automatically into a single row traveling on the delivery conveyer when either star wheel is rotated by a conveyer-propelled bottle.

9. A container conveyer and distributor for bottles or the like comprising a pair of side conveyers adapted to receive the bottles and upon which they travel in single rows, a single intervening delivery conveyer operating at a faster speed than said pair, supporting flooring bridge portions over which the bottles pass at the connecting junction between the pair and single conveyer, guides for said conveyers including deflecting sections at the junction between the pair and single conveyer, a pair of star wheels each located in the path of bottles being moved along the pair of side conveyers, the arms of said star wheels being arranged in staggered relation for individual alternating engagement by and between the adjacent units of each row thereof, and synchronizing means connecting said star wheels causing them to operate in unison and distribute the bottles alternately and automatically into a single row travelling on the delivery conveyer when either star wheel is rotated by a conveyer-propelled bottle.

10. In combination, a pair of feeding conveyers arranged at opposite sides of an intervening delivery conveyer, said delivery conveyer having its receiving end portion extending between and beyond the delivery end portions of said feeding conveyers, a pair of rotatable operatively interconnected star wheels each pivotally mounted at one side of one feeding conveyer and having fingers extending partly across the path of said feeding conveyer for engagement by a unit moved thereby, and cooperating guides directing units from the feeding conveyers to the delivery conveyer.

CHRISTIAN N. BERGMANN.